United States Patent
Kokeguchi et al.

(10) Patent No.: US 7,789,420 B2
(45) Date of Patent: Sep. 7, 2010

(54) OCCUPANT RESTRAINT APPARATUS

(75) Inventors: Akira Kokeguchi, Tokyo (JP); Isao Kawase, Tokyo (JP); Takuya Nezaki, Aichi (JP)

(73) Assignee: Takata Corporation, Tokyo (JP)

( * ) Notice: Subject to any disclaimer, the term of this patent is extended or adjusted under 35 U.S.C. 154(b) by 281 days.

(21) Appl. No.: 11/483,667

(22) Filed: Jul. 11, 2006

(65) Prior Publication Data

US 2007/0018441 A1    Jan. 25, 2007

(30) Foreign Application Priority Data

Jul. 20, 2005   (JP) .............................. 2005-210222

(51) Int. Cl.
*B60R 21/18* (2006.01)
(52) U.S. Cl. ...................... 280/733; 280/808
(58) Field of Classification Search ................ 280/733, 280/808; B60R 21/18
See application file for complete search history.

(56) References Cited

U.S. PATENT DOCUMENTS

| | | | | |
|---|---|---|---|---|
| 3,682,498 | A * | 8/1972 | Rutzki | 280/733 |
| 3,801,156 | A * | 4/1974 | Granig | 280/733 |
| 3,841,654 | A * | 10/1974 | Lewis | 280/733 |
| 3,866,940 | A * | 2/1975 | Lewis | 280/733 |
| 3,897,081 | A * | 7/1975 | Lewis | 280/733 |
| 3,933,370 | A * | 1/1976 | Abe et al. | 280/733 |
| 4,192,530 | A * | 3/1980 | Cachia | 280/802 |
| 4,592,571 | A * | 6/1986 | Baumann et al. | 280/756 |
| 4,817,754 | A * | 4/1989 | Muramoto | 180/268 |
| 5,015,010 | A * | 5/1991 | Homeier et al. | 280/808 |
| 5,149,135 | A * | 9/1992 | Konishi et al. | 280/806 |
| 5,393,091 | A | 2/1995 | Tanaka et al. | |
| 6,189,921 | B1 * | 2/2001 | Takeuchi | 280/733 |
| 6,244,621 | B1 * | 6/2001 | Kameyoshi et al. | 280/733 |
| 6,406,059 | B1 * | 6/2002 | Taubenberger et al. | 280/733 |
| 6,419,263 | B1 | 7/2002 | Büesgen et al. | |
| 6,460,881 | B1 * | 10/2002 | Adomeit | 280/733 |
| 6,648,369 | B2 * | 11/2003 | Mishima et al. | 280/733 |
| 2006/0012159 | A1 * | 1/2006 | Kore | 280/733 |
| 2010/0025972 | A1 * | 2/2010 | Nezaki | 280/730.1 |

FOREIGN PATENT DOCUMENTS

DE   4305291 A1 *  9/1993
DE   4305505 A1 *  9/1993

(Continued)

*Primary Examiner*—Paul N Dickson
*Assistant Examiner*—Laura Freedman
(74) *Attorney, Agent, or Firm*—Foley and Lardner LLP

(57) ABSTRACT

An occupant restraint apparatus includes a shoulder anchor and an occupant restraint belt. At least a portion of the occupant restraint belt that is positioned adjacent to the occupant's head is inflatable. The occupant restraint belt comes into contact with the top edge of the seat back even when the volume of the inflatable portion is reduced. A shoulder anchor is positioned behind a seat in the front-rear direction of a vehicle at substantially the same height or below the top edge of a seat back. Therefore, a shoulder belt section of an occupant restraint apparatus extending from the shoulder anchor along the front side of an occupant is in contact with the top edge of the seat back. Therefore, when the shoulder belt section is inflated, excess inflation of the shoulder belt section toward the seat back can be prevented.

20 Claims, 2 Drawing Sheets

FOREIGN PATENT DOCUMENTS

| | | |
|---|---|---|
| DE | 298 11 734 U1 | 10/1998 |
| EP | 0 963 882 A | 12/1999 |
| GB | 2 341 358 A | 3/2000 |
| JP | 56 157649 A | 12/1981 |
| JP | 10-226295 | 8/1998 |
| JP | 11-189117 | 7/1999 |
| JP | 11321552 A * | 11/1999 |
| JP | 2000142303 A * | 5/2000 |
| JP | 2001-239906 | 9/2001 |
| JP | 2003-312439 | 11/2003 |
| WO | WO 00/21798 | 4/2000 |

* cited by examiner

US 7,789,420 B2

OCCUPANT RESTRAINT APPARATUS

BACKGROUND

The present invention relates to an occupant restraint apparatus that restrains an occupant sitting in a seat of a vehicle with an inflatable belt.

As an example of an occupant restraint apparatus that restrains an occupant sitting in a seat of a vehicle with an inflatable belt, an occupant restraint apparatus including a shoulder anchor disposed behind a seat in a front-rear direction of a vehicle and an occupant restraint belt extending through the shoulder anchor and fastened on the front side of an occupant is known in the art such as, for example, Japanese Unexamined Patent Application Publication No. 2003-312439 ("JP Pub. No. '439") (which is incorporated by reference herein in its entirety). In this occupant restraint apparatus, at least a portion of the occupant restraint belt that is positioned adjacent to the occupant's head is inflatable.

In the occupant restraint apparatus (air belt apparatus) according to JP Pub. No. '439, the shoulder anchor is attached to an upper section of a pillar positioned diagonally behind the seat of the vehicle. The occupant restraint belt extends through this shoulder anchor and is fastened on the front side of the occupant sitting in the seat.

This occupant restraint belt includes a shoulder belt section and a lap belt section. The shoulder belt section passes by the occupant's head and extends diagonally along the front side of the occupant's upper body from the shoulder anchor to a position near the occupant's waist on a side opposite to the shoulder anchor. The lap belt section extends in the right-left direction of the vehicle so as to cover the occupant's abdomen. In the above-described publication, the shoulder belt section includes an inflatable bag-shaped belt. The bag-shaped belt is disposed such that a top end portion thereof is adjacent to the occupant's head. According to the above-described publication, the lap belt section also includes an inflatable bag-like belt.

When the vehicle collides or rolls over or the like, the shoulder belt section and the lap belt section are inflated to restrain the occupant. At this time, the top end portion of the shoulder belt section is inflated in a region adjacent to the occupant's head, that is, in a space between the occupant's head and a side surface of the vehicle cabin. Accordingly, the occupant's head is prevented from colliding directly with the side surface or the like of the vehicle cabin.

SUMMARY

One embodiment of the invention relates to an occupant restraint apparatus. The occupant restraint apparatus comprises a shoulder anchor disposed behind a seat in a front-rear direction of a vehicle; and an occupant restraint belt extending through the shoulder anchor and fastened on the front side of an occupant. At least a portion of the occupant restraint belt that is positioned adjacent to the occupant's head is inflatable. The shoulder anchor is at substantially the same height or below the top edge of a seat back of a seat.

Another embodiment of the invention relates to a restraint system for a vehicle occupant. The restraint system comprises a shoulder anchor disposed behind a seat in a front-rear direction of a vehicle and an occupant restraint belt extending through the shoulder anchor and configured to extend over the shoulder of the occupant and across the occupant's torso, the restraint includes an inflatable portion configured to be positioned adjacent to the occupant's head. The restraint system also includes an inflator for inflating the inflatable portion. The shoulder anchor is at substantially the same height or below the top edge of a seat back of a seat.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 2:
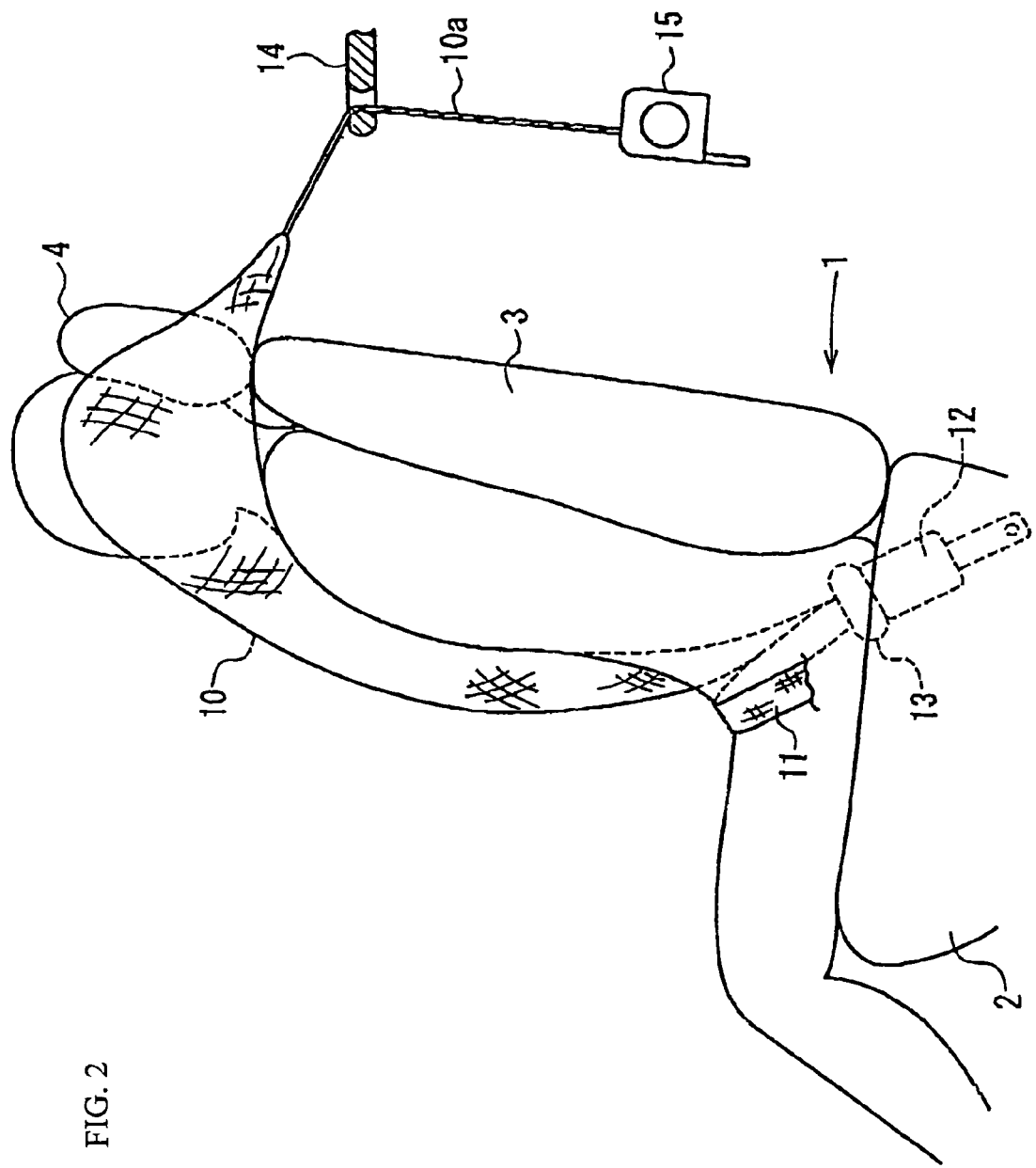
FIG. 2 is a side view of the occupant restraint apparatus shown in FIG. 1.

When the shoulder anchor is at a position higher than the top edge of a seat back of the seat, as shown in FIG. 2 of JP Pub. No. '439, the occupant restraint belt (shoulder belt section) that extends from the shoulder anchor along the front side of the occupant is spaced from the seatback in the upward direction and leaves a relatively large space between the seatback and the occupant restraint belt.

When the occupant restraint belt is inflated, the occupant restraint belt must be inflated downward (toward the seat back) by a large amount to fill the space between the occupant restraint belt and the seat back. Therefore, the volume of the inflatable portion of the occupant restraint bag is relatively large.

An object of the present invention is to provide an occupant restraint apparatus including a shoulder anchor disposed behind a seat in a front-rear direction of a vehicle and an occupant restraint belt extending through the shoulder anchor and fastened on the front side of an occupant, at least a portion of the occupant restraint belt that is positioned adjacent to the occupant's head being inflatable, wherein the occupant restraint belt comes into contact with the top edge of the seat back even when the volume of the inflatable portion is reduced.

An occupant restraint apparatus according to an embodiment includes a shoulder anchor disposed behind a seat in a front-rear direction of a vehicle and an occupant restraint belt extending through the shoulder anchor and fastened on the front side of an occupant. At least a portion of the occupant restraint belt that is positioned adjacent to the occupant's head is inflatable, and the shoulder anchor is at substantially the same height or below the top edge of a seat back of the seat.

In the occupant restraint apparatus according to an embodiment of the present invention, the shoulder anchor is positioned behind the seat in the front-rear direction of the vehicle at substantially the same height or below the top edge of the seat back. Therefore, the occupant restraint belt that extends from the shoulder anchor along the front side of the occupant is in contact with the top edge of the seat back or passes at a position extremely close (adjacent) to the top edge of the seat back.

Therefore, when the inflatable portion of the occupant restraint belt is inflated, the inflatable portion comes into contact with the top edge of the seat back without inflating at all or after inflating only slightly toward the seat back. Accordingly, the volume of the inflatable portion can be reduced.

An embodiment of the present invention will be described below with reference to the accompanying drawings.

Figure 1:
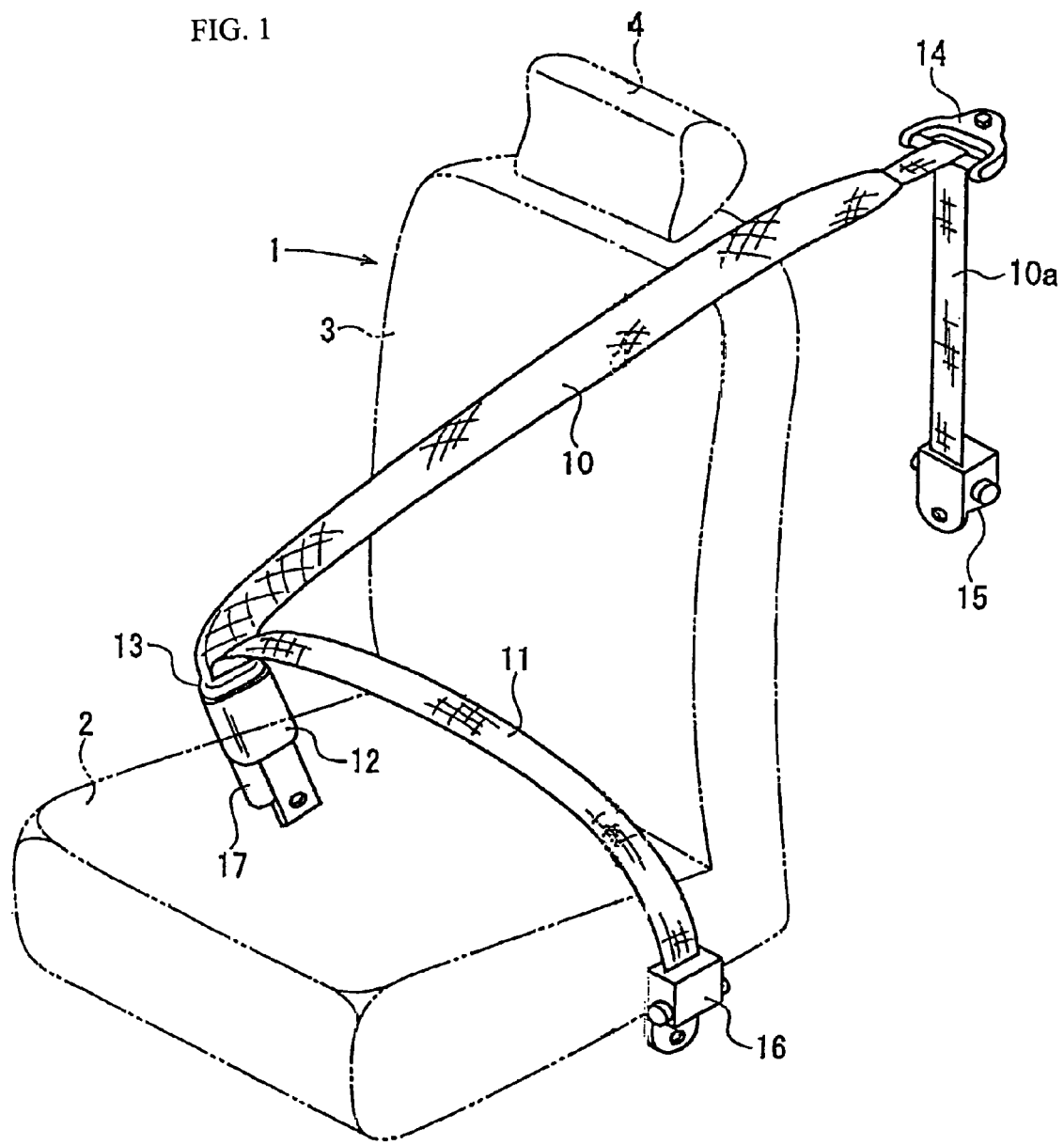
FIG. 1 is a perspective view of an occupant restraint apparatus according to an embodiment of the present invention.

FIG. 1 is a perspective view of an occupant restraint apparatus according to the present embodiment, and FIG. 2 is a side view of the occupant restraint apparatus. FIG. 2 shows a state in which an inflatable portion is inflated.

A seat 1 of a vehicle includes a seat cushion 2 on which an occupant sits, a seat back 3 that functions as a backrest, and a head rest 4 disposed on the seat back 3.

In this embodiment, the occupant restraint apparatus includes an inflatable shoulder belt section 10 that extends diagonally (from the upper left to the lower right in this embodiment) along the front side of the upper body of an occupant sitting in the seat 1, a webbing 10a connected to the shoulder belt section 10, a lap belt section 11 that extends on the waist of the occupant in the left-right direction, a buckle device 12 disposed adjacent to the seat 1 (on the right in this embodiment), a tongue 13 that is inserted into the buckle device 12 to be engaged therewith when the belt is fastened, a shoulder anchor 14 that guides the webbing 10a, and so on.

As shown in FIG. 2, the shoulder anchor 14 is positioned behind the seat 1 in the front-rear direction of the vehicle (at left rear of the seat 1 in this embodiment) at substantially the same height or below the top edge of the seat back 3 (below the top edge of the seat back 3 in this embodiment).

The installation structure of the shoulder anchor 14 in the vehicle is not particularly limited. For example, although not shown in the figure, the shoulder anchor 14 may be attached to a pillar of the vehicle positioned diagonally behind the seat 1 at a middle portion in the vertical direction of the pillar (at substantially the same height as or below the top edge of the seat back 3). Alternatively, the shoulder anchor 14 may also be attached on the top edge or back surface of the seat back 3. The shoulder anchor 14 may, of course, also be attached to other vehicle members.

In the present embodiment, the shoulder belt section 10, the webbing 10a, and the lap belt section 11 form an occupant restraint belt.

The webbing 10a is a normal belt similar to a commonly known uninflatable seatbelt, and is slidably guided by the shoulder anchor 14. One end of the webbing 10a is connected to an emergency locking seatbelt retractor (ELR) 15 disposed under the shoulder anchor 14 such that the webbing 10a can be retracted. The installation structure of the retractor 15 is also not limited. For example, the retractor 15 may be attached to the back surface of the seat back 3 together with the shoulder anchor 14.

The webbing 10a is withdrawn upward from the retractor 15 and extends through the shoulder anchor 14 toward the front of the vehicle via the top side of the seat back 3.

One end of the shoulder belt section 10 is connected to the webbing 10a by sewing or the like, and the other end of the shoulder belt section 10 is connected to the tongue 13.

In this embodiment, the lap belt section 11 is a normal belt similar to a commonly known uninflatable seatbelt. One end of the lap belt section 11 is connected to the tongue 13, and the other end of the lap belt section 11 is connected to a seatbelt retractor (ELR) 16 that is disposed at a position opposite to the buckle device 12 across the seat 1.

In this embodiment, an inflator 17 that generates high-pressure gas in case of emergency, for example, when the vehicle collides or the like, is connected to the buckle device 12. The tongue 13 has a passage (not shown) for guiding the gas from the inflator 17 to the shoulder belt section 10.

The shoulder belt section 10 is obtained by folding a wide, band-shaped bag into a thin strip shape and covering the folded bag with a cover. The strip shape of the shoulder belt section 10 is maintained under normal conditions. The occupant restraint belt, which includes the shoulder belt section 10, the webbing 10a, and the lap belt section 11, is used similarly to a normal seatbelt. When, for example, the vehicle collides or rolls over or the like, the inflator 17 is activated, and the gas is injected into the shoulder belt section 10 (bag) through the above-mentioned passage. Accordingly the shoulder belt section 10 is inflated so as to increase the thickness (diameter) thereof, as shown in FIG. 2.

As shown in the figure, when the belt is fastened, a top end portion of the shoulder belt section 10 (bag) is disposed adjacent to the occupant's head. When the inflator 17 is activated, the top end portion of the shoulder belt section 10 is largely inflated on one side of the occupant's head to restrain the occupant's head. In the present embodiment, the shoulder belt section 10 is structured such that the thickness (diameter) thereof in the inflated state are increased to the top end thereof. However, the present invention is not limited to this.

In the occupant restraint apparatus having the above-described structure, the shoulder anchor 14 is positioned behind the seat 1 in the front-rear direction of the vehicle at substantially the same height or below the top edge of the seat back 3. Therefore, the occupant restraint belt (the shoulder belt section 10 or the webbing 10a) that extends from the shoulder anchor 14 along the front side of the occupant is in contact with the top edge of the seat back 3 or passes a position extremely close to the top edge of the seat back 3.

Therefore, when the shoulder belt section 10 is inflated, the shoulder belt section 10 comes into contact with the top edge of the seat back 3 without inflating downward at all or after inflating downward only slightly. Accordingly, the shoulder belt section 10 substantially inflates only upward from the top edge of the seatback. Therefore, even if the volume of the shoulder belt section 10 is small, the occupant's head can be reliably restrained.

Although the above-described embodiment shows an example of the present invention, the present invention is not limited to the structure show in the figures.

Although only the shoulder belt section 10 is inflatable in the occupant restraint belt according to the above-described embodiment, the lap belt section 11 may also be inflatable. In addition, systems for supplying gas to the inflatable portion of the occupant restraint belt and retracting the belt when it is not used and structures in which the belt is attached to the tongue and the through anchor may also be modified from those shown in the figures.

In addition, the occupant restraint belt may also be structured such that it is inflated only on the side of the occupant's head.

Japan Priority Application 2005-210222, filed Jul. 20, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A restraint system for a vehicle occupant seated in a vehicle seat, the seat including a seat back and a head rest positioned above the seat back, wherein the seat back is configured to be positioned so that a top edge of the seat back is proximate a shoulder of the occupant, and wherein a top edge of the head rest is configured to be proximate a head of the occupant, wherein a bottom edge of the head rest is positioned at the same height as or above a top edge of the seat back, the system comprising:

a shoulder anchor disposed behind a seat in a front-rear direction of a vehicle; and an occupant restraint belt extending through the shoulder anchor and configured to extend over the shoulder of the occupant and across a torso of the occupant, wherein the restraint belt includes an inflatable portion configured to be positioned adjacent to the occupant's head; and an inflator for inflating the inflatable portion, wherein the shoulder anchor is below the top edge of the seat back of the seat, and wherein the occupant restraint belt contacts the top edge of the seat back prior to inflation such that there is no space between the top edge of the seat back and the occupant restraint belt.

2. The system of claim 1, wherein, when inflated, the inflatable portion contacts the top edge of the seat back without inflating down toward the back.

3. The system of claim 1, wherein a portion of the restraint belt that extends through the anchor includes a webbing section that is slidably guided by the anchor.

4. The system of claim 1, wherein the inflatable portion of the belt includes a band-shaped bag covered with a cover.

5. The system of claim 1, wherein the belt includes a lap belt section and wherein at least a portion of the lap belt section is inflatable.

6. The system of claim 1, wherein the inflator is connected to a buckle device.

7. The system of claim 6, wherein inflation gas from the inflator passes through a tongue to inflate the inflatable portion when the tongue is connected to the buckle device.

8. The system of claim 1, wherein the inflatable portion includes a first end portion adjacent the top edge of the seat back and a second end portion opposite the first end portion, wherein the first end portion is thicker than the second end portion of the inflatable portion.

9. The system of claim 1, wherein the inflatable portion of the occupant restraint belt contacts the top edge of the seat back upon inflation.

10. A restraint system for a vehicle occupant seated in a vehicle seat, the seat including a seat back and a head rest positioned above the seat back, wherein the seat back is configured to be positioned so that a top edge of the seat back is proximate a shoulder of the occupant, and wherein a top edge of the head rest is configured to be proximate a head of the occupant, wherein a bottom edge of the head rest is positioned at the same height as or above a top edge of the seat back, the system comprising:

a retractor;

a tongue;

wherein a shoulder anchor is positioned behind the seat in a front-rear direction of the vehicle and at a location below the top edge of the seat back, so that when an occupant restraint belt is being worn by the occupant the occupant restraint belt passes through the shoulder anchor and then makes contact with the seat without being redirected by any additional components of the restraint system located between the shoulder anchor and the seat;

the occupant restraint belt extending through the shoulder anchor and configured to extend over the shoulder of the occupant and across a torso of the occupant, wherein the restraint belt includes an inflatable portion configured to be positioned adjacent to the occupant's head; and an inflator for inflating the inflatable portion.

11. The system of claim 10, wherein, when inflated, the inflatable portion contacts the top edge of the seat back without inflating down toward the back.

12. The system of claim 10, wherein a portion of the restraint belt that extends through the anchor includes a webbing section that is slidably guided by the anchor.

13. The system of claim 10, wherein the inflatable portion of the belt includes a band-shaped bag covered with a cover.

14. The system of claim 10, wherein the belt includes a lap belt section and wherein at least a portion of the lap belt section is inflatable.

15. The system of claim 10, wherein the inflator is connected to a buckle device.

16. The system of claim 15, wherein inflation gas from the inflator passes through a tongue to inflate the inflatable portion when the tongue is connected to the buckle device.

17. The system of claim 10, wherein the inflatable portion includes a first end portion adjacent the top edge of the seat back and a second end portion opposite the first end portion, wherein the first end portion is thicker than the second end portion of the inflatable portion.

18. The system of claim 10, wherein the inflatable portion of the occupant restraint belt contacts the top edge of the seat back upon inflation.

19. The system of claim 10, wherein the shoulder anchor is mounted to a vehicle pillar.

20. The system of claim 10, wherein the shoulder anchor is connected to a rear side of the seat back.

\* \* \* \* \*